United States Patent [19]
Kerfoot et al.

[11] Patent Number: 5,581,171
[45] Date of Patent: Dec. 3, 1996

[54] ELECTRIC VEHICLE BATTERY CHARGER

[75] Inventors: Charles S. Kerfoot, Pasadena; Patricia A. O'Donnell, Davidsonville; David L. Schantz, Jr., Ellicott City, all of Md.

[73] Assignee: Northrop Grumman Corporation, Los Angeles, Calif.

[21] Appl. No.: 258,154

[22] Filed: Jun. 10, 1994

[51] Int. Cl.⁶ .................................................. H02J 7/04
[52] U.S. Cl. .................. 320/50; 320/39; 320/1; 323/235
[58] Field of Search .................... 320/1, 50, 57, 320/27, 39, 40; 323/238, 235

[56] References Cited

U.S. PATENT DOCUMENTS

| | | | |
|---|---|---|---|
| 4,200,830 | 4/1980 | Oughton et al. | 320/32 |
| 4,258,304 | 3/1981 | Bourke | 320/2 |
| 4,920,475 | 4/1990 | Rippel | 363/132 |
| 5,182,518 | 1/1993 | Stitch et al. | 324/511 |
| 5,192,905 | 3/1993 | Karlin et al. | 320/23 |
| 5,227,712 | 7/1993 | Boman | 320/21 |

FOREIGN PATENT DOCUMENTS

| | | | |
|---|---|---|---|
| 116925 | 2/1984 | European Pat. Off. | H02J 7/02 |
| 548749 | 12/1992 | European Pat. Off. | H02J 7/10 |
| 89017198 | 8/1988 | WIPO | H02M 7/44 |

OTHER PUBLICATIONS

H. Scherf et al. "Kompakter serienreifer Antrieb fur Elektrofahrzeuge" Brown Boveri Technik, vol. 72, Jan. 1985, pp. 229–234 (Not Translated).

Research Disclosure, No. 338, Jun. 1992 Emsworth GV, p. 517, "Hands free electric vehicle charging" see the whole document.

Maui Hawai US, vol. 2, Power Electronics, 15 Nov. 1993, pp. 637–643 G. Hua et al. "Soft–switching techniques in PWM convertrs".

Primary Examiner—Robert E. Nappi
Attorney, Agent, or Firm—Philip A. Florenzo

[57] ABSTRACT

An on-board electric vehicle battery charger includes a surge limiter circuit, a power factor control circuit, and a resonant inverter circuit. The power factor control circuit includes a boost regulator circuit providing a fixed voltage on an output capacitor. The resonant inverter circuit uses a resonance capacitor and the leakage inductance of an output transformer to establish a resonance frequency at least 500 times the AC input power frequency.

11 Claims, 7 Drawing Sheets

FIG.6
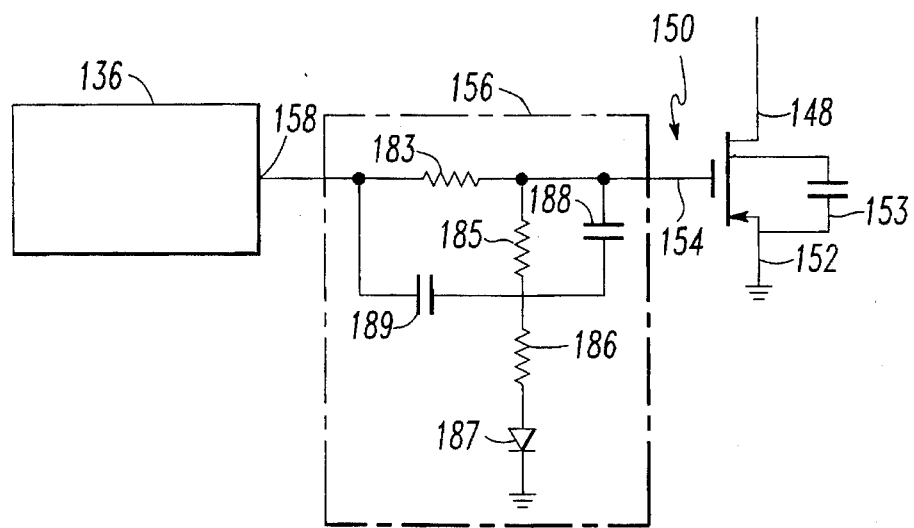
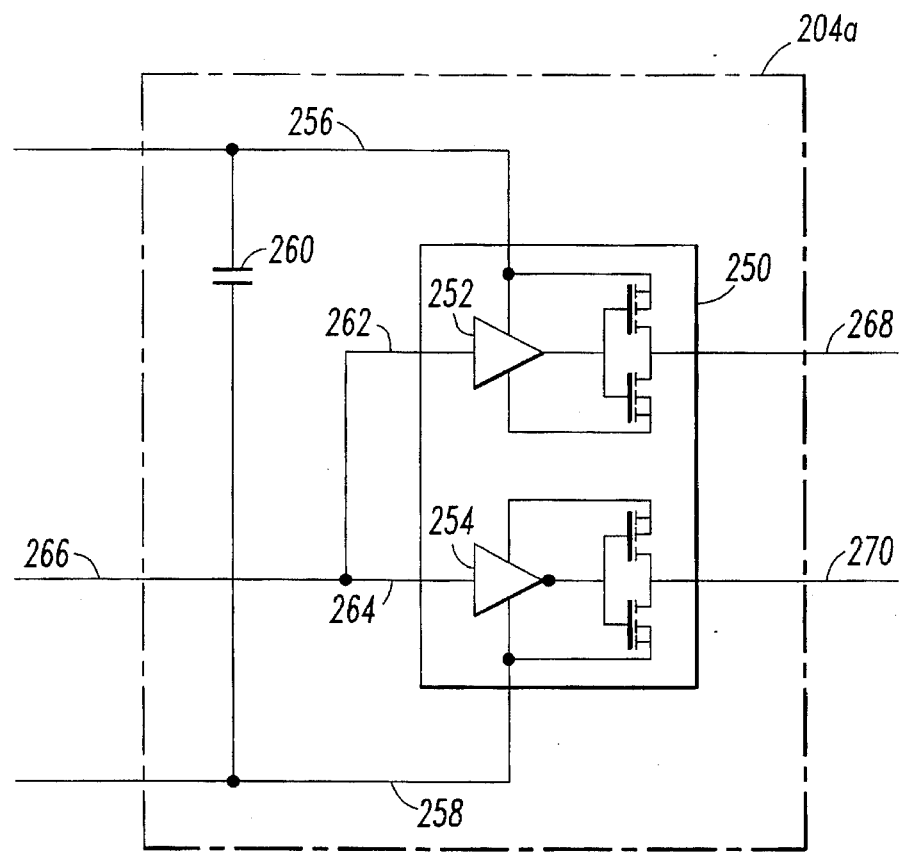
FIG.8

ELECTRIC VEHICLE BATTERY CHARGER

RELATED APPLICATIONS

The following identified U.S. patent applications are filed on the same date as the instant application and are relied upon and incorporated by reference in this application.

U.S. patent application Ser. No. 08/258,295, U.S. Pat No. 5,475,581, entitled "Flat Topping Concept" bearing attorney docket No. 58,295, and filed on the same date herewith;

U.S. patent application Ser. No. 08/258,150, U.S. Pat. No. 5,519,269 entitled "Electric Induction Motor And Related Method Of Cooling" bearing attorney docket No. 58,332, and filed on the same date herewith;

U.S. patent application Ser. No. 08/258,142, entitled "Automotive 12 Volt System For Electric Vehicles" bearing attorney docket No. 58,333, and filed on the same date herewith;

U.S. patent application Ser. No. 08/258,027, U.S. Pat. No. 5,504,378, entitled "Direct Cooled Switching Module For Electric Vehicle Propulsion System" bearing attorney docket No. 58,334, and filed on the same date herewith;

U.S. patent application Ser. No. 08/258,301 entitled "Electric Vehicle Propulsion System" bearing attorney docket No. 58,335, and filed on the same date herewith;

U.S. patent application Ser. No. 08/258,294 entitled "Speed Control and Bootstrap Technique For High Voltage Motor Control" bearing attorney docket No. 58,336, and filed on the same date herewith;

U.S. patent application Ser. No. 08/258,306 entitled "Vector Control Board For An Electric Vehicle Propulsion System Motor Controller" bearing attorney docket No. 58,337, and filed on the same date herewith;

U.S. patent application Ser. No. 08/258,305, U.S. Pat. No. 5,506,484 entitled "Digital Pulse Width Modulator With Integrated Test And Control" bearing attorney docket No. 58,338, and filed on the same date herewith;

U.S. patent application Ser. No. 08/258,149, U.S. Pat. No. 5,463,294 entitled "Control Mechanism For Electric Vehicle" bearing attorney docket No. 58,339, and filed on the same date herewith;

U.S. patent application Ser. No. 08/258,153, entitled "Improved EMI Filter Topology for Power Inverters" bearing attorney docket No. 58,340, and filed on the same date herewith;

U.S. patent application Ser. No. 08/258,179, U.S. Pat. No. 5,481,194, entitled "Fault Detection Circuit For Sensing Leakage Currents Between Power Source And Chassis" bearing attorney docket No. 58,341, and filed on the same date herewith;

U.S. patent application Ser. No. 08/258,117, entitled "Electric Vehicle Relay Assembly" bearing attorney docket No. 58,342, and filed on the same date herewith;

U.S. patent application Ser. No. 08/258,033, U.S. Pat. No. 5,517,063, entitled "Three Phase Power Bridge Assembly" bearing attorney docket No. 58,343, and filed on the same date herewith;

U.S. patent application Ser. No. 08/258,034, entitled "Electric Vehicle Propulsion System Power Bridge With Built-In-Test" bearing attorney docket No. 58,344, and filed on the same date herewith;

U.S. patent application Ser. No. 08/258,178, U.S. Pat. No. 5,510,725, entitled "Method For Testing A Power Bridge For An Electric Vehicle Propulsion System" bearing attorney docket No. 58,345, and filed on the same date herewith;

U.S. patent application Ser. No. 08/258,157, entitled "Electric Vehicle Power Distribution Module" bearing attorney docket No. 58,346, and filed on the same date herewith;

U.S. patent application Ser. No. 08/258,628, U.S. Pat. No. 5,508,594 entitled "Electric Vehicle Chassis Controller" bearing attorney docket No. 58,347, and filed on the same date herewith;

U.S. patent application Ser. No. 08/258,156 entitled "Electric Vehicle System Control Unit Housing" bearing attorney docket No. 58,348, and filed on the same date herewith;

U.S. patent application Ser. No. 08/258,299, entitled "Low Cost Fluid Cooled Housing For Electric Vehicle System Control Unit" bearing attorney docket No. 58,349, and filed on the same date herewith;

U.S. patent application Ser. No. 08/258,296, entitled "Electric Vehicle Coolant Pump Assembly" bearing attorney docket No. 58,350, and filed on the same date herewith; and U.S. patent application Ser. No. 08/258,141, U.S. Pat. No. 5,469,124, entitled "Heat Dissipating Transformer Coil" bearing attorney docket No. 58,351, and filed on the same date herewith.

BACKGROUND OF THE INVENTION

1. Field of the Invention

The present invention relates to an electric vehicle and, more particularly, to a battery charger mounted on board the vehicle. While the invention is subject to a wide range of applications, it is especially suited for use in electric vehicles that utilize batteries or a combination of batteries and other sources, e.g., a heat engine coupled to an alternator, as a source of power, and will be particularly described in that connection.

2. Discussion of the Related Art

The internal combustion automobile has long supplied an important share of the world's transportation needs. However, it is inevitable that petroleum reserves which supply fuel for the global internal combustion vehicle fleet will sooner or later decline to a point where the cost of fuel for internal combustion vehicles becomes unacceptable. Another factor clouding the future of internal combustion vehicles is the ever more stringent regulation of exhaust emissions from such vehicles. These and other factors have led to increasing efforts to develop a commercially viable alternative to the internal combustion vehicle which uses an electric propulsion system.

For an electric vehicle to be commercially viable, its costs and performance should be competitive with that of its internal combustion counterparts. Typically, the vehicle's propulsion system and battery are the main factors which contribute to the vehicle's cost and performance competitiveness. In particular, consumers may be reluctant to give up their internal combustion automobile for an electric vehicle because of concern that an electric vehicle will not have sufficient range to return to a station for charging of its battery. The uncertainties caused by a lack of a precise way to measure the remaining charge in the batteries and the significant range reduction suffered by batteries in cold weather climates justifies this concern. In addition, most consumers desire the capability to charge their batteries at home overnight. Therefore, an on-board battery charger that can be plugged into a standard residential 230-volt receptacle is an important factor in the acceptance and use of electric vehicles.

As yet, there is no standard for batteries used to power electric vehicles. Some of the more common types include conventional lead-acid batteries, high density lead-acid batteries, deep-discharge lead-acid batteries, nickel-cadmium batteries, nickel-metal batteries, and nickel-metal hydride batteries. Newer and more advanced battery types are currently under development. It is possible that after an electric vehicle is sold, a newer and better performing electric battery may become readily available, creating an incentive to install a new battery in the vehicle.

Even for an individual battery, the terminal voltage varies widely according to its state of charge. Thus, expected terminal voltage of an electric vehicle battery can range from around 100 volts up to and above 600 volts. It is not economically feasible to design a separate battery charger for each specific type of battery or battery pack voltage. Neither is it economically sound to require replacement of a battery charger when the battery type is upgraded or otherwise changed. Therefore, there is a requirement for a universal on-board battery charger capable of supplying charging current over a wide range of terminal voltages.

Another requirement for an on-board battery charger is that it be small and lightweight, since each pound of extra weight carried by the vehicle represents a shorter distance that can be travelled before "refueling" (recharging). The battery charger must also be self-contained because 12-volt power, pumps, or cooling fluids or other auxiliary support capabilities will not always be available. Therefore, the battery charger must be air cooled and must supply its own operating power from the 230-volt charging source. Since the battery charger is located on-board the vehicle, it must exist in an automotive environment and be capable of operation from −40° C. to +85° C. Moreover, since the charger will be plugged into electrical outlets where lethal voltages are present, it must pose no safety hazard during operation. The only way to ensure safe operation is to provide the capability for the battery charger to operate through a standard ground fault circuit interrupter (GFCI) as is commonly employed in residential environments to monitor and protect from fault current. None of the existing electric vehicle battery chargers currently meets all of the requirements set forth above.

SUMMARY OF THE INVENTION

Accordingly, the present invention is directed to an electric vehicle battery charger that substantially obviates one or more of the problems caused by limitations and disadvantages of the related art.

Features and advantages of the invention will be set forth in the description which follows, and in part will be apparent from the description, or may be learned by practice of the invention. The objectives and other advantages of the invention will be realized and attained by the method and apparatus particularly pointed out in the written description and claims of the present application, as well as the appended drawings.

To achieve these and other advantages and in accordance with the purpose of the invention, as embodied and broadly described, the invention provides for an electric vehicle battery charger which comprises an input circuit for receiving AC input power having a voltage varying between first and second values and a power factor control circuit for maintaining a power factor of the AC input power above a first power factor value. The power factor control circuit comprises an output capacitor, a boost regulator circuit for establishing an output voltage across the output capacitor, and a regulator control circuit for maintaining the output voltage above the second AC input voltage value. The battery charger further comprises an inverter circuit for converting energy stored in the output capacitor into a DC charging current at a charging voltage for charging a vehicle battery.

In another aspect, the invention provides an electric vehicle battery charger which comprises an input circuit, a power factor control circuit, and an inverter circuit. The inverter circuit further comprises two pairs of MOS-controlled thyristors (MCTs) each having a gate terminal and first and second switching terminals. The first switching terminal of one of the MCTs in each pair is coupled to the first terminal of an output capacitor of the power factor control circuit. The second terminal of the other MCTs in each pair is coupled to the second terminal of the output capacitor and the remaining switching terminals of the MCTs in each pair are connected at a respective MCT junction. The inverter circuit further comprises an output rectifier circuit, a circuit common connection, and an output transformer. The output transformer has a secondary winding connected to the output rectifier circuit, a center tap connected to the circuit common connection, a primary winding having a first terminal coupled to one of the MCT junctions, and a leakage inductance. The inverter circuit further comprises a resonance capacitor having a first terminal coupled to the other of the MCT junctions and a second terminal coupled to a second terminal of the primary winding. The resonance capacitor and the leakage inductance establish a resonant frequency of the inverter circuit greater than the input power frequency by at least a factor of 500.

It is to be understood that both the foregoing general description and the following detailed description are exemplary and explanatory and are intended to provide explanation of the invention as claimed.

BRIEF DESCRIPTION OF THE DRAWINGS

The accompanying drawings, which are included to provide a further understanding of the invention and are incorporated in and constitute a part of this specification, illustrate a presently preferred embodiment of the invention and, together with a description serve to explain the principles of the invention. In the drawings:

FIG. 6 is an electric schematic diagram of the gate drive circuit of FIG. 5;

FIG. 8 is an electrical schematic diagram of a gate driver circuit shown in FIG. 7.

DESCRIPTION OF THE PREFERRED EMBODIMENT

Reference will now be made in detail to a present preferred embodiment of the invention, an example of which is illustrated in the accompanying drawings.

Figure 1:
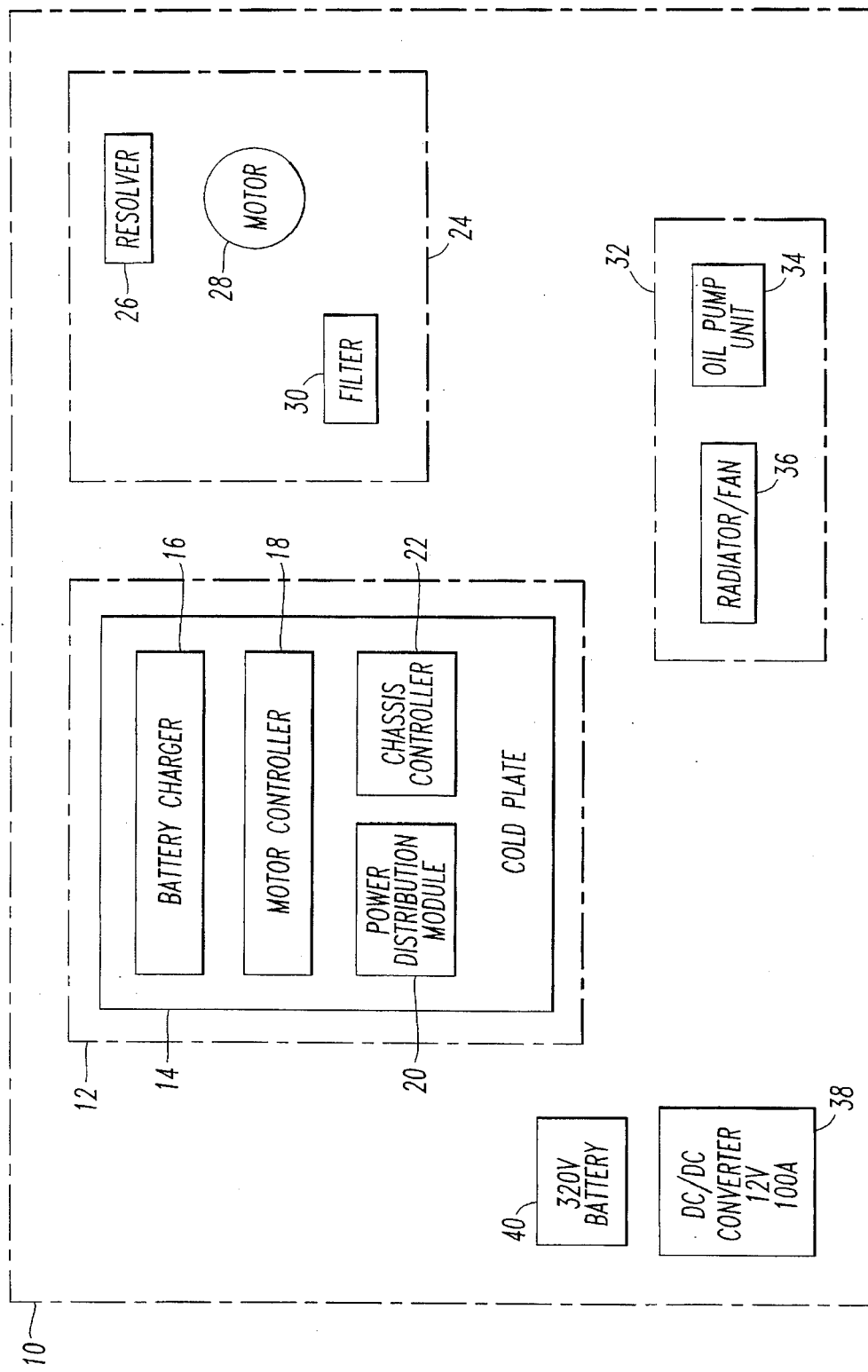
FIG. 1 is a block diagram of an electric vehicle propulsion system in accordance with a preferred embodiment of the invention.

As shown in FIG. 1, there is provided in an electric vehicle propulsion system 10 comprising a system control unit 12, a motor assembly 24, a cooling system 32, a battery 40, and a DC/DC converter 38. The system control unit 12 includes a cold plate 14, a battery charger 16, a motor controller 18, a power distribution module 20, and a chassis controller 22. The motor assembly 24 includes a resolver 26, a motor 28, and a filter 30. The cooling system 32 includes an oil pump unit 34 and a radiator/fan 36.

Figure 2:
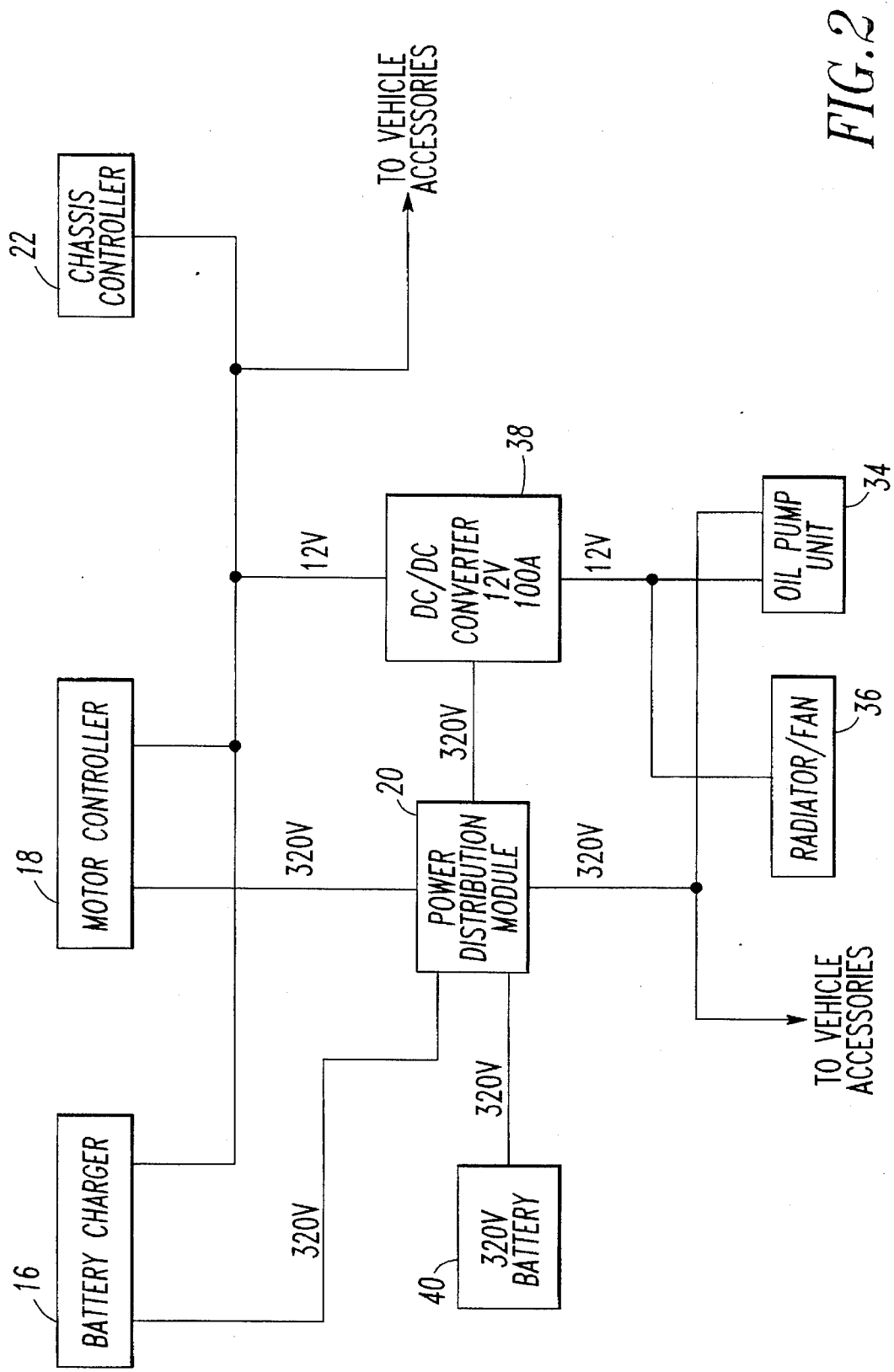
FIG. 2 is a power distribution diagram of the electric vehicle propulsion system of FIG. 1.

FIG. 2 is a power distribution diagram of the electric vehicle propulsion system 10. As shown in FIG. 2, the battery 40 serves as the primary source of power for the electric propulsion system 10. The battery 40 comprises, for example, a sealed lead acid battery, a monopolar lithium metal sulfide battery, a bipolar lithium metal sulfide battery, or the like, for providing a 320 volt output. Preferably, the electric propulsion system 10 works over a wide voltage range, e.g., 120 volts to 400 volts, to accommodate changes in the output voltage of the battery 40 due to load or depth of discharge. However, the electric vehicle propulsion system 10 is preferably optimized for nominal battery voltages of about 320 volts.

The power distribution module 20 is coupled to the output of the battery 40 and includes, among other things, fuses, wiring, and connectors for distributing the 320 volt output from the battery 40 to various components of the electric vehicle propulsion system 10. For example, the power distribution module 20 distributes the 320 volt output from the battery 40 to the motor controller 18, the DC/DC converter 38, the oil pump unit 34, and the battery charger 16. The power distribution module 20 also distributes the 320 volt output from the battery 40 to various vehicle accessories, which are external to the electric vehicle propulsion system 10. These vehicle accessories include, for example, an air conditioning system, a heating system, a power steering system, and any other accessories that may require a 320 volt power supply. Additional details concerning the power distribution module 20 are disclosed in copending U.S. patent application Ser. No. 08/258,157 (Westinghouse Case No. 58,346) entitled "ELECTRIC VEHICLE POWER DISTRIBUTION MODULE" filed on the same day as this application.

The DC/DC converter 38, which, as described above, is coupled to the 320 volt output of the power distribution module 20, converts the 320 volt output of the power distribution module 20 to 12 volts. The DC/DC converter 38 then supplies its 12-volt output as operating power to the battery charger 16, the motor controller 18, the chassis controller 22, the oil pump unit 34, and the radiator/fan 36. The DC/DC converter 38 also supplies its 12 volt output as operating power to various vehicle accessories, which are external to the electric vehicle propulsion system 10. These vehicle accessories include, for example, vehicle lighting, an audio system, and any other accessories that may require a 12-volt power supply. It should be appreciated that the DC/DC converter 38 eliminates the need for a separate 12-volt storage battery. Additional details concerning the DC/DC converter 38 are disclosed in copending U.S. patent application Ser. No. 08/258,142 (Westinghouse Case No. 58,333) entitled "AUTOMOTIVE 12-VOLT SYSTEM FOR ELECTRIC VEHICLES" and U.S. patent application Ser. No. 08/258,141 (Westinghouse Case No. 58,351) entitled "HEAT DISSIPATING TRANSFORMER COIL" filed on the same day as this application.

Figure 3:
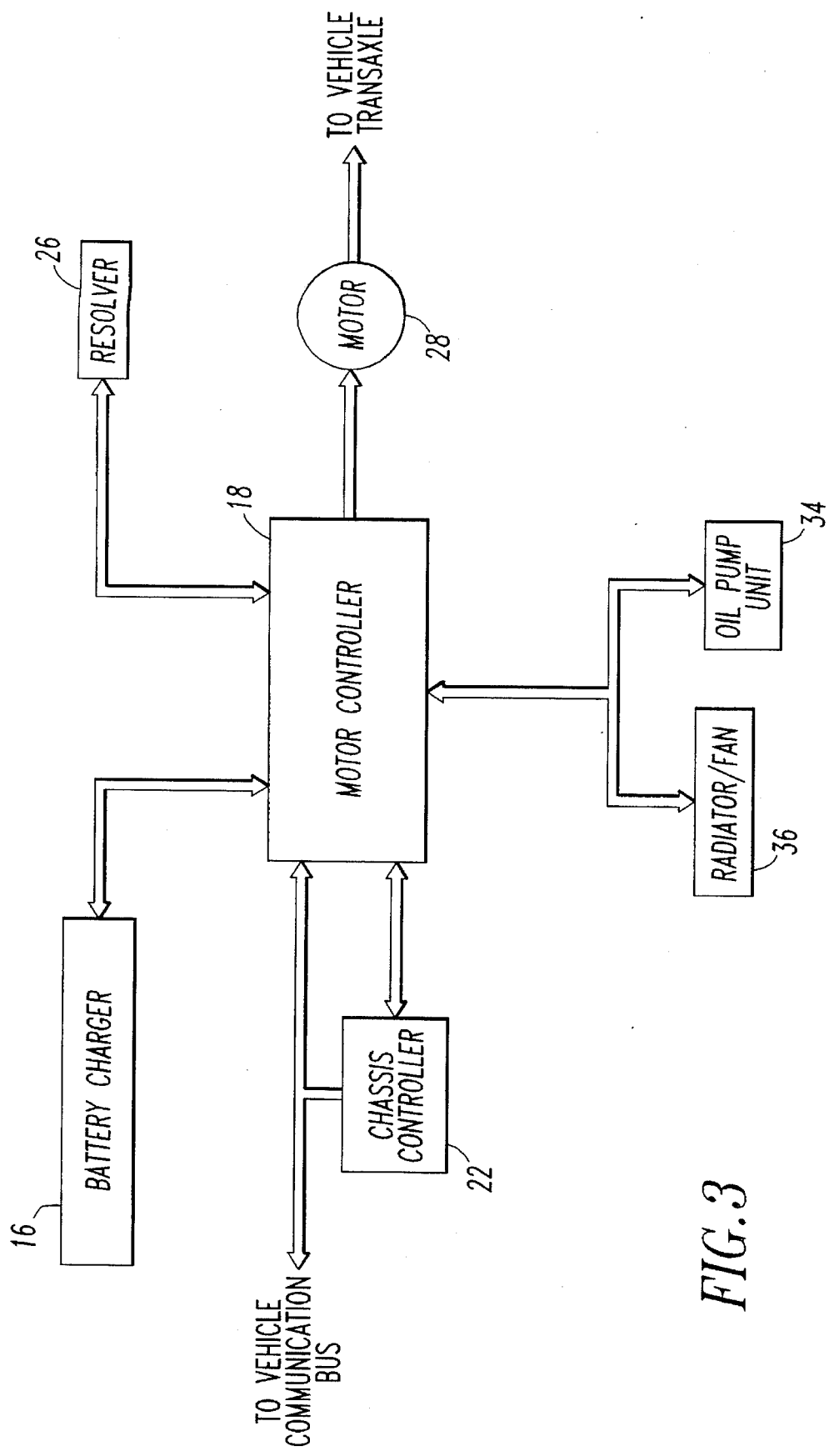
FIG. 3 is a functional diagram of the electric vehicle propulsion system of FIG. 1.

As shown in FIG. 3, the components of the electric vehicle propulsion system 10 are interconnected via various data busses. The data busses can be of the electrical, optical, or electro-optical type as is known in the art.

The battery charger 16 receives command signals from and sends status signals to the motor controller 18 for charging the battery 40. The battery charger 16 provides a controlled battery charging current from an external AC power source (not shown in FIG. 3). As will be described below, AC current is drawn from the external source at near-unity power factor and low harmonic distortion in compliance with expected future power quality standards. Further, the battery charger 16 is designed to be compatible with standard ground fault current interrupters and single-phase power normally found at residential locations.

Figure 4:
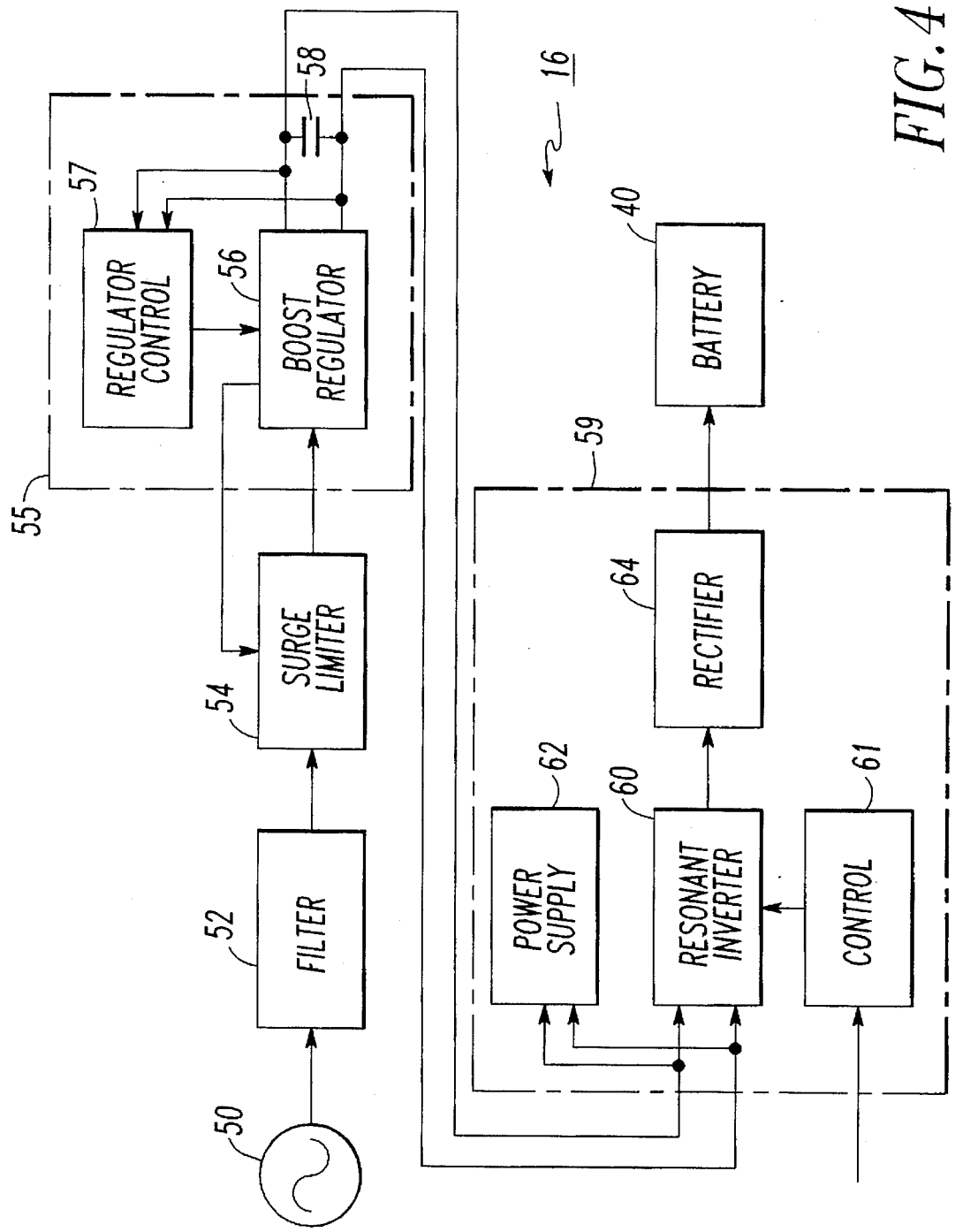
FIG. 4 is a block diagram of the battery charger shown in FIG. 1–3.

Referring now to FIG. 4, there is shown a block diagram of the battery charger 16 of FIGS. 1–3. AC power is supplied to the battery charger 16 from a standard residential 230 volt AC receptacle 50 at 50 or 60 Hz. Although the nominal voltage is 230 volts AC, the voltage may vary in practice from a first value of about 185 volts AC to a second value of about 265 volts AC. Incoming power is supplied to an input circuit comprising a line filter 52 which is designed to reduce the transmission into the AC power network of high frequency harmonics and switching transients generated by battery charger 16. The design of the filter 52 is conventional and will not be described in greater detail.

The filtered AC power from the filter 52 is supplied to a surge limiter circuit 54. This circuit ensures that when the battery charger 16 is first activated, a large inrush of initial current will not occur. In practice, surge limiter circuit 54 generally limits the flow of current into battery charger 16 to an initial inrush current value of 1.75 amps which decays to zero at an RC time rate of 0.46 seconds.

The output of surge limiter circuit 54 is supplied to a power factor control circuit 55. The power factor control circuit 55 maintains an essentially unity power factor in the AC power line connected to the receptacle 50 to prevent the generation of power line frequency harmonics. As will be described in greater detail, the power factor control circuit 55 forces the waveform of current flow through battery charger 16 to match that of the voltage. The power factor control circuit 55 also serves to limit the current supplied by battery charger 16 to a predetermined value.

The power factor control circuit 55 includes a boost regulator circuit 56, a regulator control circuit 57, and an output capacitor 58. In normal operation of the battery charger 16, the boost regulator circuit 56 charges the output capacitor 58 to a voltage above the second input AC voltage value of 285 volts, as established by the regulator control circuit 57. In the preferred embodiment, the regulator control circuit 57 establishes a voltage value of 385 volts on the output capacitor 58.

The output of the power factor control circuit 55 is supplied to an inverter circuit 59 which includes a resonant inverter 60, a control circuit 61, a separate power supply 62, and a rectifier circuit 64. The output of the rectifier circuit 64 supplies DC charging current to the battery 40.

Figure 5:
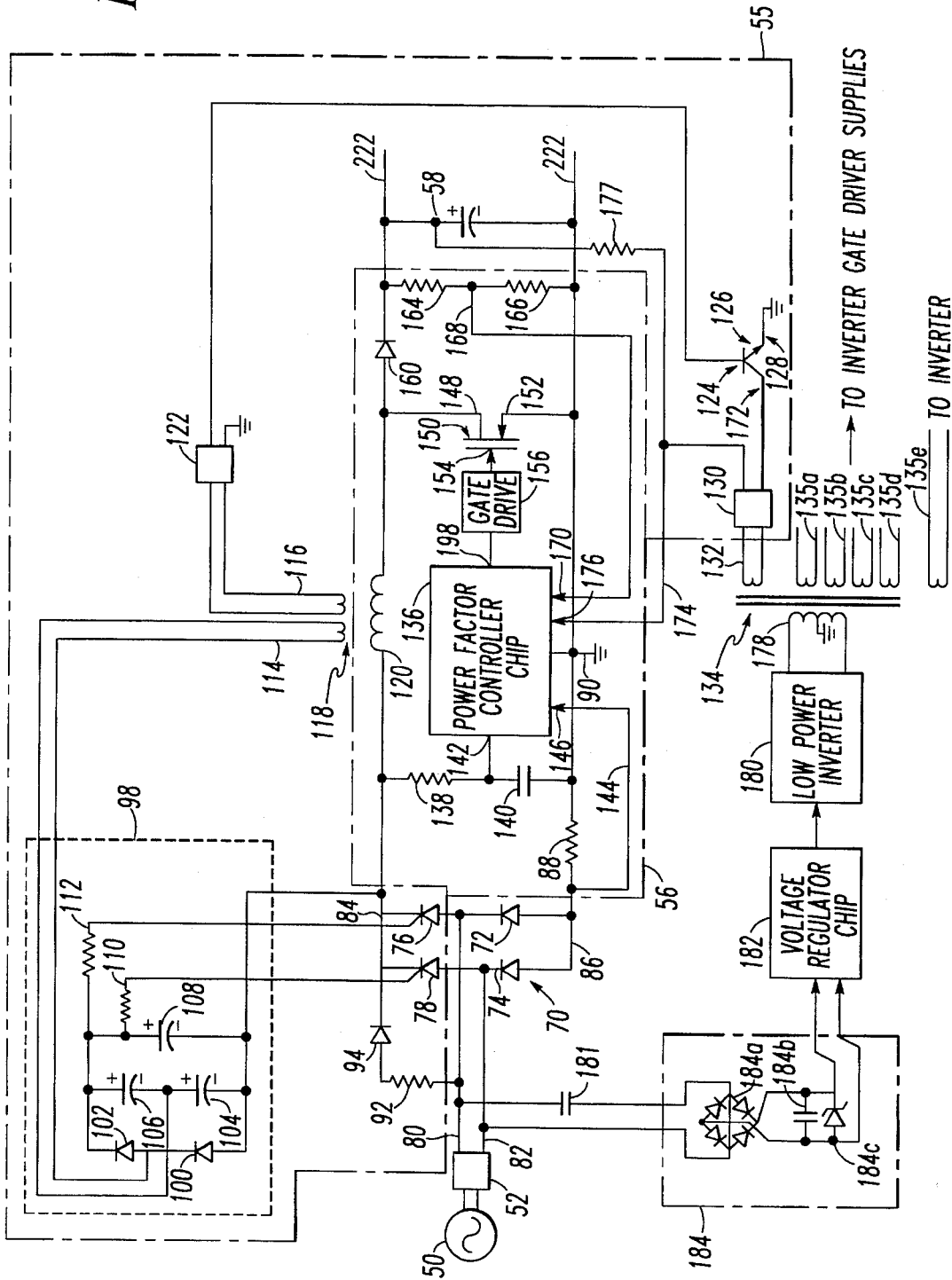
FIG. 5 is an electrical schematic diagram of the surge limiter circuit and power factor control circuit of FIG. 4.

Referring now to FIG. 5, the surge limiter circuit 54 will now be described in greater detail. The surge limiter 54 includes a four-branch bridge rectifier circuit 70 including a first diode 72, a second diode 74, a first controlled rectifier device comprising a silicon controlled rectifier (SCR) 76 and a second controlled rectifier device comprising an SCR 78.

Filtered AC input power is supplied from the filter circuit 52 over first and second input conductors 80 and 82. The first input conductor 80 is connected to the junction of the diode 72 and the SCR 76. The second input conductor 82 is connected to the junction between the diode 74 and the SCR 78. A first output 84 of the rectifier bridge circuit 70 is connected to the junction of the first and second SCRs 76 and 78. A second output 86 of the rectifier bridge 70 is connected to the junction of the diodes 72 and 74. The second output 86 of the rectifier bridge 70 is connected through a current sensing resistor 88 to a circuit common connection 90. A surge limiting resistor 92 and an inrush rectifier comprising a diode 94 are connected in series between the input conductor 80 and the first output 84 of the rectifier bridge 70.

The invention includes means coupled to the power factor control circuit for selectively activating the controlled rectifier device control terminals at a time subsequent to activation of the battery charger. As embodied herein, the selective activation means comprises the activation circuit 98 and the transformer 118 of the surge limiter circuit 54. The activation circuit 98 includes a pair of diodes 100, 102; capacitors 104, 106, and 108; and resistors 110, 112. The resistor 110 is connected to the control terminal of the SCR 78 and the resistor 112 is connected to the control terminal of SCR 76.

The surge limiter circuit 54 also includes secondary windings 114 and 116 of a transformer 118. The transformer 118 also includes a primary winding 120 to be described more completely in connection with the power factor control circuit 55. The secondary winding 114 is connected to the junction of diodes 100 and 102 and to the junction of capacitors 104 and 106.

The secondary winding 116 is connected to the input of a rectifier circuit 122 which supplies a DC control signal to a gate terminal 124 of a transistor 126. A collector 172 of the transistor 126 is connected to one output terminal of a rectifier circuit 130, the input of which is connected to a secondary winding 132 of a transformer 134. The transformer 134 also includes five additional secondary windings 135a, 135b, 135c, 135d, and 135e. The other output of the rectifier circuit 130 is connected to the 15-volt supply for the power factor controller chip 136.

The transformer 134 supplies approximately 30 volts AC output across the secondary windings 132 and 135a–135e. The rectifier circuit 130 is of conventional construction and provides filtered DC operating power at approximately 20 volts DC for use by a power factor controller chip 136 to be more completely described below.

As shown in FIG. 5, the power factor control circuit 55 includes a power factor controller chip 136. The power factor controller chip 136 may be a type LT1248 integrated circuit commercially available from Linear Technologies, Inc. The power factor control circuit 55 also includes a voltage wave shape sensing circuit including a resistor 138 and a capacitor 140. A first terminal of the resistor 138 is connected to the output conductor 84 of the bridge rectifier circuit 70. The other terminal of the resistor 138 is connected to a terminal of the capacitor 140 and to an AC current sensing input terminal 142 of the chip 136. The other terminal of the capacitor 140 is connected to the circuit common connection 90.

The junction of the output terminal 86 and the current sensing resistor 88 is connected over a conductor 144 to a current sense terminal 146 of the power factor controller chip 136.

The primary winding 120 of the transformer 118 is connected to the output terminal 84 and to a drain terminal 148 of a switching field effect transistor (FET) 150. In the preferred embodiment, the FET 150 comprises a type IRFP450 switching FET manufactured by the International Rectifier Corporation. The FET 150 preferably has a continuous current rating of 14 amps and a voltage rating of 500 volts. A source terminal 152 of the FET 150 is connected to the circuit common connection 90. A gate terminal 154 of the FET 150 is connected to the output of a gate drive circuit 156, the input of which is connected to a gate drive output terminal 158 of the power factor controller chip 136.

The drain terminal 148 of the FET 150 is also connected to one terminal of a diode 160, the other terminal of which is connected to the output capacitor 58. In the preferred embodiment, the output capacitor 58 is charged to an operating voltage of 385 volts during normal operation, in which the battery charger 16 is delivering 20 amps of charging current to battery 40. Accordingly, in the preferred embodiment, the output capacitor 58 comprises a 2200 microfarad aluminum electrolytic capacitor having a voltage rating of 450 volts DC.

A voltage divider consisting of a pair of resistors 164 and 166 is connected across the terminals of the capacitor 58. A voltage sense line 168 connected to the junction of resistors 164 and 166 is supplied to a voltage sense terminal 170 of the power factor controller chip 136.

The rectifier circuit 130 is connected via a conductor 174 to an input power supply terminal 176 of the power factor controller chip 136. A resistor 177 is also connected to the conductor 174 and to the output capacitor 58.

The transformer 134, coupled to the transistor 126 via its secondary wiring 132, includes a center tapped primary winding 178 which is connected to the output of a low power inverter circuit 180. The input of the low power inverter circuit 180 is connected to a voltage regulator chip 182. Filtered AC power is supplied from output terminals 80 and 82 of the filter circuit 52 to the voltage regulator chip 182 through a capacitor 181 and a rectifier circuit 184. The rectifier circuit 184 includes a bridge rectifier 184a, a capacitor 184b, and a zener diode 184c. The rectifier circuit 184 and the capacitor 181 serve as a current source providing 15 volt filtered DC power to the voltage regulator chip 182 which, in the preferred embodiment, may comprise a type UC2526ADW voltage regulator chip commercially available from the Unitrode Integrated Circuits Corporation of Merrimack, N.H. The voltage regulator circuit 182 serves as a common power supply control circuit for a plurality of floating power supplies connected to the secondary windings 135a–135d, to be described more completely in connection with the inverter circuit 59. The low power inverter circuit 180 provides switched DC input power to the primary winding 178. The circuit 180 is of conventional construction and may include a pair of type IRFR110 switching FETs commercially available from the International Rectifier Corporation.

FIG. 6 shows an electrical schematic diagram of the gate drive circuit 156 of FIG. 5. The gate drive circuit 156 includes a resistor 183 having one terminal connected to the gate drive output terminal 158 of the power factor controller chip 136. The other terminal of the resistor 183 is connected to the gate terminal 154 of the switching FET 150.

One terminal of another resistor 185 is also connected to the gate terminal 154. The other terminal of the resistor 185 is connected to one terminal of a resistor 186. The other terminal of the resistor 186 is connected to an anode terminal of a diode 187, the cathode of which is connected to the circuit common connection 90. A capacitor 188 is connected in parallel with the resistor 185. Another capacitor 189 is connected between the gate drive output terminal 158 of the power factor controller chip 136 and the junction of resistors 185 and 186.

Figure 7:
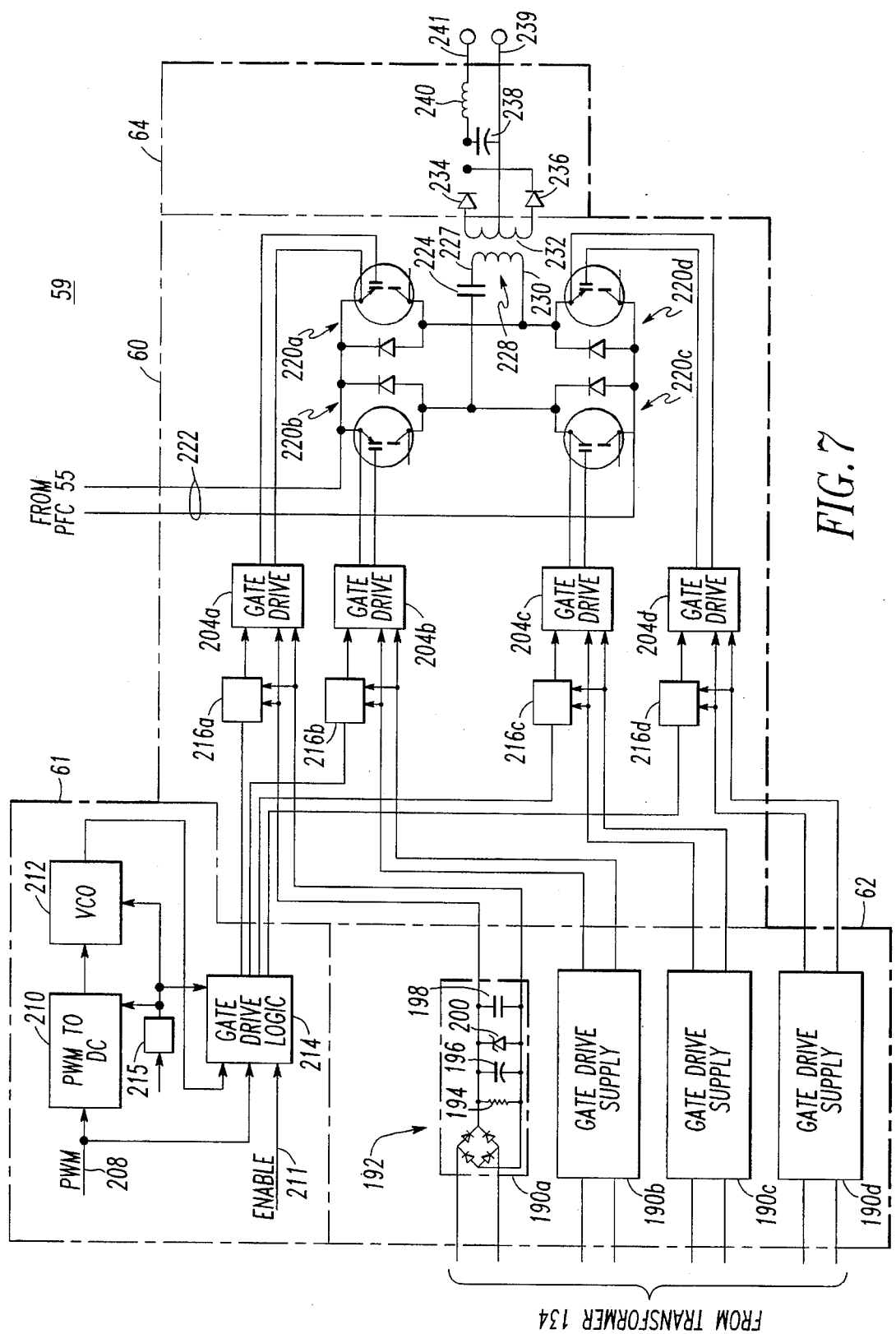
FIG. 7 is an electrical schematic diagram of the inverter circuit of FIG. 4.

FIG. 7 shows an electrical schematic diagram of the inverter circuit 59. The inverter circuit 59 includes a power supply 62 providing operating power for circuitry within inverter circuit 59. In particular, the power supply circuit 62 comprises the rectifier circuit 184, the voltage regulator circuit 182, the low power inverter circuit 180, and the transformer 134 (FIG. 5). The power supply circuit 62 further includes four separate floating gate drive power supplies 190a, 190b, 190c, and 190d. Each of the gate drive power supplies 190a–190d is connected to a separate one of the secondary windings 135a, 135b, 135c, and 135d. The gate drive power supplies 190a–190d are identical. Thus, only the gate drive power supply 190a will be described in detail.

In general the gate drive power supply 190a includes a bridge rectifier circuit 192, a resistor 194, capacitors 196 and 198, and a base load device comprising regulating zener diode 200. AC input power at a level of about 15 volts is supplied to the input of the bridge rectifier circuit 192. The resistor 194, capacitors 196 and 198, and the base load device comprising regulating zener diode 200 are connected in parallel across the output of the bridge rectifier circuit 192. The gate drive power supply 190a thus provides 15-volt DC operating power over conductors 202a to a gate driver circuit 204a of the resonant inverter circuit 60. In a similar manner, the gate drive supplies 190b, 190c, and 190d provide operating power over respective conductors 202b, 202c, and 202d to corresponding gate driver circuits 204b, 204c, and 204d. In the preferred embodiment, each of the gate driver circuits 204a–204d comprises a type TC4425EOA dual gate driver chip commercially available from the Teledyne Semiconductor Corporation of Mountain View, Calif.

The regulating zener diodes 200 in each gate drive supply 190a–190d function with the capacitor 181 and rectifier circuit 184 to provide that the capacitor 181 and rectifier circuit 184 operate properly as a current source power supply. Specifically, the value of the capacitor 181 is selected to provide the proper impedance necessary to permit desired current flow at the supplied voltage and the base load devices 200 in the supplies 190a–190d insure that the desired current will flow at the desired voltage even when the gate driver circuits 204a–204d fail to collectively draw the desired current.

In the preferred embodiment, it is desired to provide 0.5 amps at 230 volts AC. Therefore, the value of the capacitor 181 is chosen as 8 microfarads.

Referring now to FIG. 8, there is shown a detailed schematic diagram of the gate driver circuit 204a. The gate driver circuits 204b, 204c, and 204d are identical to the gate driver circuit 204a. Thus, only the gate driver circuit 204a will be described in detail. As noted above, the gate driver circuit 204a includes a type TC4425EOA dual gate driver chip 250. The chip 250 includes a non-inverting amplifier circuit 252 and an inverting amplifier circuit 254 each connected to a common power input terminal 256 and to a common ground terminal 258. Terminals 256 and 258 are connected to conductors 202a. A capacitor 260 is connected across terminals 256 and 258.

The circuits 252 and 254 also include respective input terminals 262 and 264. The input terminals 262 and 264 are connected together in the gate driver circuit 204a to form a single input 266 which is connected to the output of the optoisolator circuit 216a. The chip 250 also includes a pair of output terminals 268 and 270 which are respectively connected to the source and gate terminals of the MCT 220a.

In operation, the gate drive supply 190a provides single ended 15-volt DC operating power to terminals 256 and 258 of the gate driver circuit 204a. The optoisolator circuit 216a produces a pulse signal varying between a voltage of 0 and +15 volts DC to the input terminal 266. The gate driver circuit 204a thus transforms the 15-volt pulse signals supplied by the optoisolator circuit 216a into a differential 15-volt MCT drive pulse signal which is supplied over the terminals 268 and 270 to the source and gate terminals of the MCT 220a. Through the use of separate floating gate drive supplies 190a–190d, differential drive signals can be supplied to MCTs 220a–220d without the need for a negative voltage power supply.

The control circuit 61 of the inverter circuit 59 is supplied with a pulse width modulated (PWM) signal 208 from a battery energy management system (BEMS) of the motor controller 18 which monitors the charge state of the battery 40 to determine the amount of charging current required. The PWM signal 208 is supplied to a PWM-to-DC converter circuit 210. The converter circuit 210 produces a DC voltage which, in the preferred embodiment, varies between 4 and 14 volts, depending upon the amount of battery charging current commanded by the BEMS to be delivered by the battery charger 16 to the battery 40. The converter circuit 210 supplies the variable DC voltage to a voltage controlled oscillator (VCO) 212. The VCO 212 produces a pulse signal which, in the preferred embodiment, varies between 4 KHz and 85 KHz in response to the 4–14 volt DC signal produced by the converter circuit 210.

The pulse signal produced by the VCO 212 is supplied to a gate drive logic circuit 214. The gate drive logic circuit 214 conditions the pulse signal arriving from the VCO 212 to generate a pulse signal having a width which matches the resonant frequency of resonant inverter circuit 60 to be described below in greater detail. In the preferred embodiment, the width of pulses generated by the gate drive logic circuit 214 is 5 microseconds. The gate drive logic circuit 214 then supplies the pulse signals through optoisolator circuits 216a, 216b, 216c, and 216d to the gate drive circuits 204a, 204b, 204c, and 204d. The gate drive logic circuit 214 also includes a temperature shutdown feature which causes the gate drive logic circuit 214 to cease generation of an output signal when the temperature of the battery charger 16 exceeds a predetermined value of, for example, 100° C.

The gate drive logic circuit 214 also receives an ENABLE signal from the BEMS which permits the BEMS to selectively shut down the operation of the battery charger 16 for a short period of time to permit the BEMS to monitor the charge condition of the battery 40. The gate drive logic circuit 214 also includes an internal monitoring circuit which monitors the duty cycle of the PWM from the BEMS to cause the gate drive logic circuit 214 to operate only when the duty cycle of the PWM is between 5% and 95%.

A power supply circuit 215 coupled to the secondary winding 135e (FIG. 5) supplies operating power to the converter circuit 210, the VCO 212, and the gate drive logic circuit 214.

The gate driver circuits 204a–204d of the resonant inverter circuit 60 are each connected to a respective MOS-controlled thyristor (MCT) 220a, 220b, 220c, and 220d. Each MCT 220a–220d comprises an electronic switch having a pair of switching output terminals which are selectively activated by gate drive signals generated by the gate drive circuits 204a–204d.

The output terminals of MCT's 220b and 220c are connected in series across a pair of conductors 222 which are in turn connected to the output terminals of the output capacitor 58. Similarly, the output terminals of MCT's 220a and 220d are connected in series across conductors 222. The junction of MCT's 220b and 220c is connected to one terminal of a resonance capacitor 224. The other terminal of the resonance capacitor 224 is connected to one terminal 226 of a primary winding 227 of a transformer 228. The other terminal 229 of the primary winding 227 is connected to the junction of MCT's 220A and 220d by a conductor 230.

The transformer 228 includes a center tapped secondary winding 232 in the rectifier circuit 64. One terminal of the secondary winding 232 is connected to a first terminal of a diode 234. The other terminal of the secondary winding 232 is connected to a first terminal of another diode 236. The second terminals of diodes 234 and 236 are connected to one terminal of a capacitor 238, the other terminal of which is connected to the battery negative connection 239. The junction of diodes 234 and 236 is also connected to one terminal of an output inductor 240. The other terminal of output inductor 240 is connected to an output terminal 241 which supplies battery charging current to the positive terminal of battery 40. Diodes 234 and 236, the capacitor 238, and the output inductor 240 thus form the rectifier circuit 64.

The resonant inverter circuit 60 comprises a resonant power circuit consisting of the capacitor 224 and the leakage inductance of the transformer 228. The resonant action between the capacitor 224 and the leakage inductance of the transformer 228 amplifies the voltage across the capacitor 224 which greatly increases the energy in the capacitor 224 since that energy is proportional to the square of the voltage across the capacitor 224.

The transformer 228 in the preferred embodiment is wound upon a ferrite core having a permeability of 2700 at 25° C. and a shape comprised of two pieces—a "square C" and a bar that closes the magnetic circuit. The primary winding 227 of the transformer 228 consists of 36 turns of copper foil 1.2 inches wide and 5 mils thick. The secondary winding 232 comprises 47 turns of identical copper foil. The leakage inductance of the transformer 228 is, in the preferred embodiment, within a range of 90 to 100 microhenries, preferably 95 microhenries.

The operation of the battery charger 16 will now be explained. When the battery charger 16 is plugged into the receptacle 50 (FIG. 5), 230-volt AC power is supplied through the line filter 52 and appears on input conductors 80 and 82. Charging current flows through the surge limiting resistor 92, the diode 94, the primary winding 120, and the diode 160 to charge the output capacitor 58. Although input current is also supplied to the rectifier circuit 70, the SCRs 76 and 78 are initially in a nonconducting state and thus no current flows through the lower half of the rectifier circuit 70. At this time, terminal 124 renders the transistor 126 nonconductive. Thus, the only voltage appearing on conductor 174 is through the resistor 177 connected to the output capacitor 58. Output capacitor 58 thus charges at a slow rate limited by current flow through the resistor 92.

After a predetermined period of time, the output capacitor 58 charges to a value sufficient to yield a voltage of 15.5 volts on conductor 174. The power factor controller chip 136 then begins operation by periodically activating the gate drive terminal 158 and the gate drive circuit 156 to cause periodic switching of transistor 150. This causes periodic voltage polarity reversals on the primary winding 120 of transformer 118 which in turn induces an AC voltage across secondary windings 114 and 116.

The voltage generated across the secondary winding 116 is rectified by the rectifier circuit 122 to generate a signal on the base terminal 124 of the transistor 126. The transistor 126 is then rendered conductive. The primary winding 178 of transformer 134 has been previously energized by the low power inverter 180 through operation of the rectifier circuit 184 and voltage regulator chip 182 at the time when the battery charger 16 was first connected to the receptacle 50. Thus, output voltage appearing across the secondary winding 132 is rectified by the rectifier circuit 130 and supplied to the terminal 176 to provide steady state operating power for the power factor controller chip 136.

As output voltage appears across the secondary winding 114 of the transformer 118, the activation circuit 98 generates an activating signal to the control terminals of the SCRs 76 and 78. The rectifier circuit 70 can then function as a full wave bridge rectifier with the capability of supplying the full battery charging current from output conductors 84 and 86. In the preferred embodiment, the full battery charging current is established at 20 amperes.

The power factor controller chip 136 includes a slow start circuit which, after operating power is supplied to the chip 136, slowly allows the transistor 150 and the primary winding 120 of the transformer 118 to function as a boost regulator. In the preferred embodiment, the regulator control circuit 57 comprises an integral portion of the type LT1248 power factor controller chip 136. The regulator control feature of the power factor controller chip 136 regulates the voltage across the output capacitor 58 to the desired output voltage of 385 volts through monitoring of the voltage supplied to the voltage sense terminal 170. Of course, by appropriate adjustments to the power factor controller chip 136, other output voltages may be attained. Procedures for setting the output voltage are well known in the art, as described, for example, in the application literature published with respect to the LT1248 chip.

The boost regulator function of the power factor controller chip 136 allows the battery charger 16 to be employed with a wide variety of AC input voltages to be supplied by the receptacle 50. Lower line voltages can be accommodated, while maintaining the desired output voltage upon output capacitor 58, through operation of the FET 150 at a higher duty cycle by the power factor controller chip 136. At higher input voltages of the AC receptacle 50, the power factor controller chip 136 operates the FET 150 at a lower duty cycle. In the preferred embodiment, the battery charger 16 maintains the power factor at the AC input receptacle 50 at a value of essentially unity, through a setting of the output voltage of the capacitor 58 at a higher voltage than the peak voltage of the highest AC line voltage supplied by the receptacle 50.

Maintaining an essentially unity power factor in the AC input power line prevents the generation of power line frequency harmonics. The unity power factor is achieved by the power factor controller chip by sensing the voltage wave shape across the resistor 138 and the capacitor 140 at the wave form input terminal 142 and forcing the current wave shape across the resistor 88 to be proportional and in phase with the voltage wave shape. The power factor control circuit 56 forces the current wave shape across the resistor 88 to match that of the voltage by varying the duty cycle of the switching FET 150 at the frequency of the AC input voltage at the receptacle 50.

The power factor control circuit 56 also senses the current across the resistor 88 via the conductor 144 and current sense input terminal 146 to limit the current in two ways. First, the input current is limited to a desired value of, for example, 30 amperes, by appropriate settings of the power factor controller chip 136. If more than 30 amperes is demanded by the inverter circuit 59, the power factor controller chip 136 decreases the output voltage supplied at the output capacitor 58 until the power demand is satisfied by 30 amperes. The second current limiting function is a protective feature used in the case of overcurrent transients which are too fast for the control loop provided in the power factor controller chip 136 to follow. This protective feature is set at a value approximately 10 percent higher than the 30 ampere limit, and is achieved by an overcurrent protection feature incorporated into the power factor controller chip 136. If the peak current demanded by the inverter circuit 59 exceeds the protective feature value, the power factor controller chip 136 terminates the signal at the gate drive control terminal 158, thereby disabling the switching function of the switching FET 150 and disabling the boost function until the overcurrent condition has been cleared. If the protective current limiting feature is activated, resumption of normal operation is initiated by the power factor controller chip utilizing the slow turn-on feature which gradually increases the set point output voltage of the output capacitor 58 until it reaches the desired output value. In this manner, the power factor control circuit 56 limits the creation of large current surges on the AC line connected to the receptacle 50.

The operation of the gate drive circuit 156 will now be described with reference to FIG. 6. The switching FET 150 includes a gate-to-source capacitance indicated by the capacitor 153 in FIG. 6. The value of this capacitance can be quite high in power switching FETs such as the transistor 150. This capacitance must be charged above a given threshold voltage in order to turn on the FET 150. In order to turn off the FET 150, the gate-to-source capacitance 153 must be discharged. For fast switching, it is known to overcharge the capacitance, thereby reaching the threshold voltage quickly. To turn off the FET just as quickly, it is necessary to overcharge the capacitance in the other direction. This requires that the gate terminal 154 must be driven negatively with respect to the source terminal 152. Normally, this requires a negative power supply. However, the gate drive terminal 158 constitutes a single-ended power supply, and the provision of a negative power supply in an on board battery charger for an electric vehicle is inconvenient and expensive.

Accordingly, the present invention provides a resistive voltage divider formed of resistors 183,185, and 186. This voltage divider thus includes a first terminal comprising an input terminal to the gate drive circuit 156 and a second terminal connected to the anode of a diode 187. The resistive voltage divider also forms a pair of junctions, the first of which constitutes the junction between resistor 183 and 185 and the second of which constitutes the junction between resistors 185 and 186.

Each of the resistors 183,185 and 186 are of the same value which, in the preferred embodiment, comprises a value of 50 ohms. Thus, when the gate drive output terminal for the power factor controller circuit 158 rises to, for example, 15 volts, the voltage at the gate terminal 154 will be two thirds of this, or about ten volts. Ten volts is greater than the threshold voltage of the FET 150, and the FET 150 is turned on. The capacitor 189 is then charged to about 10 volts. The capacitor 188 is charged to about 5 volts, and the gate-to-source capacitance 153 is charged to about 10 volts.

This condition begins with the first pulse generated upon the gate drive output terminal 158 and becomes established within several switching intervals when capacitors 188 and 189 are at least ten times greater than the gate-to-source capacitance 153 and when the time constants formed by resistors 183,185, and 186 and capacitors 188 and 189 are several times longer than the switching interval of the transistor 150. In the preferred embodiment, capacitors 188 and 189 have a value of 0.47 microfarad.

When the gate drive output terminal 158 has a voltage value of 15 volts and the source terminal 152 of the transistor 150 is connected to the circuit common connection, capacitors 188, 189, and 153 also divide this voltage, although not equally. When the gate drive output terminal 158 is driven to the potential of the circuit common connection, the sum of the voltages across capacitors 188, 189 and the gate-to-source capacitance 153 must change to zero. However, the only current that can flow through capacitors 188 and 189, to quickly change the voltage across these capacitors, must also flow through the gate-to-source capacitance 153. Since the gate-to-source capacitance 153 is so much smaller than capacitors 188 and 189, the current flow through it causes a much larger voltage change across the gate-to-source capacitance 153 than across either of capacitors 188 or 189.

Essentially, the entire 15-volt change occurs across the gate-to-source capacitance 153, thus switching the voltage on the gate from +10 volts to −5 volts. The gate drive circuit 156 thus provides positive and negative gate drive signals to the FET 150 from the single-ended power supply of the terminal 158. In this manner, the gate drive circuit 156 achieves the desired rapid switching of the FET 150 without the necessity for providing a separate negative voltage power supply.

If the battery 40 is in a state of charge other than a fully charged condition, the battery energy management system (BEMS) of the motor controller 18 will supply the PWM signal 208 and the enable signal 211 to the inverter circuit 59 (FIG. 7). Power is supplied to the PWM to DC converter 210, the VCO 212, and the gate drive logic circuit 214 by the power supply 215, which is supplied with AC voltage by the secondary winding 135e of the transformer 134 (FIG. 5).

The PWM to DC converter 210 then converts the PWM signal 208 to a DC voltage which, in the preferred embodiment, varies between 4 and 14 volts depending upon the state of charge of the battery 40. The VCO 212 then converts the DC voltage to a corresponding pulse signal having a frequency which, in the preferred embodiment, may vary between 4 and 85 KHz. This pulse signal is then converted by the gate drive logic circuit 214 into four separate pulse signals supplied through the optoisolators 216a–216d to the gate driver circuits 204a–204d.

The pulse signals supplied to the gate driver circuits 204a–204d have the same frequency as the pulse signals supplied by the VCO 212 and have a pulse width which matches the resonant frequency of the resonant inverter circuit 60. The signals supplied by the gate driver circuits 204a–204d constitute differential signals connected to the gate and source terminals of MCTs 220a–220d, sufficient to turn on and off the MCT's 220a–220d of the resonant inverter circuit 60.

The topology of the resonant inverter circuit 60 is a resonant power circuit consisting of the capacitor 224 and the leakage inductance of the transformer 228. Operation of the resonant inverter circuit 60 begins with the gate drive logic circuit 214 turning on MCTs 220b and 220d. Current flows through the capacitor 224 and the primary winding 227 until a peak charge is attained on the capacitor 224. Through transformer action, current is induced in the upper half of the secondary winding 232 through the diode 234 and into the capacitor 238. Then the gate drive logic circuit 214 switches off the MCTs 220b and 220d and simultaneously turns on the MCTs 220a and 220c. Current then flows through the primary winding 227 of the transformer 228 in the opposite direction and charges the capacitor 224 up to a peak voltage of opposite polarity. Again, transformer action causes current to flow in the secondary winding 232, but this time in the lower half of the winding. Current thus flows through the diode 236 and into the output capacitor 238. Each time switching occurs, the energy in the capacitor 224 is transferred to the capacitor 238, and the capacitor 224 is recharged with energy from the output capacitor 58 through the conductors 222.

As noted above, resonant action between the capacitor 224 and the leakage inductance of the transformer 228 amplifies the voltage across the capacitor 224. This greatly increases the energy in the capacitor 224, since such energy is proportional to the square of the voltage across the capacitor. In the preferred embodiment, voltages approaching 1100 volts can be attained across the primary winding 226.

Packets of energy transferred into the capacitor 238 are independent of the voltage existing on this capacitor, so long as the voltage at the secondary winding 232 is equal to or greater than the voltage on the capacitor 238. Therefore, with a constant input voltage from the capacitor 58, and with the transformer 228 wound as a step-up transformer, any desired voltage can be attained upon the capacitor 238 up to about 600 volts. Since current is equal to the amount of charge (that is, the number of energy packets) multiplied by the frequency, the output current supplied through the inductor 240 is easily controlled by varying the frequency at which the MCT's 220a–220d are operated. The inductor 240 filters the charging current supplied to the battery 40 by removing high frequency components.

In the preferred embodiment, the nominal power delivered to the battery is 6 kilowatts. The maximum power delivered to the battery is set by the line voltage multiplied by 30 amperes.

The present invention thus provides a battery charger including a resonant inverter circuit resonating and operating at a high frequency with respect to the input power frequency. Preferably, the resonant frequency is at least 500 times the input frequency. In the preferred embodiment, the resonant inverter circuit 60 resonates at 100 KHz compared to the AC input frequency of 50 or 60 Hz and operates at a maximum frequency of 85 KHz. This high frequency operation permits the use of very small magnetic parts in the transformer 228, thereby significantly reducing the size and weight of the battery charger. By employing MCTs as switching devices in a soft switch resonant topology, very high peak current levels at very low voltage drops across the switching devices are achieved, thereby further reducing the size and greatly contributing to the high efficiencies of the battery charger 16. Thus, it is possible to maintain proper operating temperature of the battery charger 16 by air cooling.

It should be apparent to those skilled in the art that various modifications and variations can be made to the present invention without departing from the spirit or scope of the invention. Thus, it is intended that the present invention cover the modifications and variations of this invention, provided they come within the scope of the appended claims and their equivalents.

We claim:

1. An electrical vehicle battery charger, comprising:

an input circuit including a line filter for receiving Ac input power having an input power frequency and a voltage varying between first and second voltage values;

a surge limiter for limiting an initial inrush current, when the battery charger is activated, to a first inrush current value, said surge limiter including an inrush rectifier coupled to the input circuit, a surge limiting resistor connected in series with the inrush rectifier, a pair of controlled rectifier devices each having a control terminal and a pair of switch terminals connected in parallel with the inrush rectifier and the surge limiting resistor, and means coupled to the power factor control circuit for selectively activating the controlled rectifier device control terminals at a time subsequent to activation of the battery charger a power factor control circuit coupled to the input circuit for maintaining the power factor of the AC input power above a first power factor value, the power factor control circuit having an output capacitor, a boost regulator circuit for establishing an output voltage across the output capacitor, and a regulator control circuit for maintaining the output voltage above the second AC input voltage value; and a resonant inverter circuit coupled to the power factor control circuit for converting energy stored in the output capacitor in to a DC charging current at a charging voltage for charging a vehicle battery.

2. An electric vehicle battery charger, comprising:

an input circuit for receiving AC input power having voltage varying between first and second voltage values and an input power frequency;

a power factor control circuit for maintaining a power factor of the AC input power above a first power factor value, the power factor control circuit comprising an output capacitor having first and second terminals, a boost regulator circuit for establishing an output voltage across the output capacitor, and a regulator control circuit for maintaining the output voltage above the second voltage value;

an inverter circuit for converting energy stored in the output capacitor into a DC charging current at a charging voltage for charging a vehicle battery, the inverter circuit comprising:

two pairs of MOS controlled thyristors (MCTs) each having a gate terminal and first and second switching terminals, the first switching terminal of one of the MCTs in each pair being coupled to the first terminal of the output capacitor, the second terminal of the other MCT in each pair being coupled to the second terminal of the output capacitor, and the remaining switching terminals of the MCTs in each pair being connected at a respective MCT junction;

a plurality of MCT gate drive circuits each including a gate driver circuit and separate floating power supply;

an output rectifier circuit;

an output transformer having a secondary winding connected to the output rectifier circuit, a center tap connected to a negative terminal of the battery, a primary winding having a first terminal coupled to one of the MCT junctions, and a leakage inductance; and a resonance capacitor having a first terminal coupled to the other of the MCT junctions and a second terminal coupled to a second terminal of the primary winding, the resonance capacitor and leakage inductance establishing a resonant frequency of the inverter circuit greater than the input power frequency by at least a factor of 500.

3. An electric vehicle battery charger, comprising: an input circuit for receiving AC input power having an input power frequency and a voltage varying between first and second voltage values;

a power factor control circuit coupled to the input circuit for maintaining the power factor of the AC input power above a first power factor value, the power factor control circuit having an output capacitor, a boost regulator circuit for establishing an output voltage across the output capacitor, and a regulator control circuit for maintaining the output voltage above the second AC input voltage value; and a resonant inverter circuit including a plurality of controlled thyristors coupled to the power factor control circuit for converting energy stored in the output capacitor into a DC charging current at a charging voltage for charging a vehicle battery, said inverter circuit further including a respective gate drive circuit for each of said plurality of controlled thyristors and a separate floating power supply for each said gate drive circuit.

4. An electric vehicle battery charger as recited in claim 3, wherein each of the floating power supplies comprises a separate single power supply providing positive and negative power inputs to a respective gate drive circuit.

5. An electric vehicle battery charger as recited in claim 4, wherein each of the floating power supplies includes a base load device, and wherein the inverter circuit includes a common power supply control circuit for the floating power supplies and a current source circuit connected between the input circuit and the power supply control circuit.

6. An electric vehicle battery charger as recited in claim 5, wherein the current source circuit comprises a rectifier bridge circuit having an input and an output, a first capacitor connected in series with the input of the rectifier bridge circuit, and a second capacitor connected in parallel with the output of the rectifier bridge circuit.

7. A electric vehicle battery charger as recited in claim 3 wherein said plurality of controlled thyristors comprises MOS controlled thyristors.

8. An electric vehicle battery charger, comprising:

an input circuit for receiving AC input power having an input power frequency and a voltage varying between first and second voltage values;

a power factor control circuit coupled to the input circuit for maintaining the power factor of the AC input power above a first power factor value, the power factor control circuit having an output capacitor, a boost regulator circuit for establishing an output voltage across the output capacitor, and a regulator control circuit for maintaining the output voltage above the second AC input voltage value;

an inverter circuit coupled to the power factor control circuit for converting energy stored in the output capacitor into a DC charging current at a charging voltage for charging a vehicle battery, and further comprising a circuit common connection and wherein the field effect transistor gate drive circuit includes, a gate drive circuit input terminal, a resistive voltage divider having first and second terminals and first and second junctions, a rectifier having a first terminal connected to the second terminal of the resistive voltage divider and a second terminal connected to the circuit common connection, the first terminal of the resistive voltage divider being connected to the gate drive circuit input terminal and the first junction being connected to the gate, wherein one of the source and drain terminals is connected to the circuit common connection; and wherein the gate drive circuit further includes a first capacitor having one terminal connected to the gate drive circuit input terminal and another terminal connected to the second junction, and a second capacitor connected between the first and second junctions.

9. An electric vehicle battery charger, comprising:

an input circuit for receiving AC input power having an input power frequency and a voltage varying between first and second voltage values;

a power factor control circuit coupled to the input circuit for maintaining the power factor of the AC input power above a first power factor value, the power factor control circuit having an output capacitor, a boost regulator circuit for establishing an output voltage across the output capacitor, and a regulator control circuit for maintaining the output voltage above the second AC input voltage value; and an inverter circuit coupled to the power factor control circuit for converting energy stored int he output capacitor into a DC charging current at a charging voltage for charging a vehicle battery, and wherein the inverter circuit comprises a resonant inverter having a resonant frequency and operating at a switching frequency establishing the charging voltage, the resonant inverter further comprising a resonance capacitor and an output transformer having a leakage inductance, the value of the resonance capacitor and the leakage inductance establishing the resonant frequency as a value greater than the input power frequency by a factor of at least 500.

10. An electric vehicle battery charger as recited in claim 9, wherein the inverter circuit further comprises a control circuit responsive to a pulse-width modulated control signal generated externally to the battery charger for setting the switching frequency.

11. An electric vehicle battery charger as recited in claim 9, wherein the battery charger supplies a predetermined maximum current and the resonance capacitor value and the leakage inductance value establish a resonant frequency at which the battery charger supplies a predetermined maximum current.

* * * * *